(12) United States Patent
Braun et al.

(10) Patent No.: US 12,099,347 B2
(45) Date of Patent: Sep. 24, 2024

(54) OPTION CARD FOR FACILITATING COMMUNICATION IN DRIVE APPLICATIONS

(71) Applicant: Rockwell Automation Technologies, Inc., Mayfield Heights, OH (US)

(72) Inventors: Scott D Braun, Menomonee Falls, WI (US); Todd A. Wiese, Hubertus, WI (US); Dave C. Mazur, Mequon, WI (US); Marius G. Chis, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 148 days.

(21) Appl. No.: 17/484,966

(22) Filed: Sep. 24, 2021

(65) Prior Publication Data
US 2023/0096101 A1 Mar. 30, 2023

(51) Int. Cl.
G05B 19/418 (2006.01)
G05B 19/042 (2006.01)
H04L 12/28 (2006.01)

(52) U.S. Cl.
CPC ..... *G05B 19/4185* (2013.01); *G05B 19/0425* (2013.01); *H04L 12/283* (2013.01)

(58) Field of Classification Search
CPC ....... H04L 12/10; H04L 12/12; H04L 12/283; H04L 12/4625; G05B 19/4185; G05B 19/0425
See application file for complete search history.

(56) References Cited

U.S. PATENT DOCUMENTS

| | | | |
|---|---|---|---|
| 5,822,615 A * | 10/1998 | Yamashita | G05B 19/0423 710/10 |
| 7,082,485 B2 | 7/2006 | Ellerbrock et al. | |
| 7,558,846 B2 | 7/2009 | Gu | |
| 7,660,889 B2 | 2/2010 | Gotesdyner | |
| 7,949,721 B2 | 5/2011 | Burrow et al. | |
| 8,359,397 B2 | 1/2013 | Traversat | |
| 8,582,469 B2 | 11/2013 | Rosenberg | |
| 8,931,101 B2 | 1/2015 | Saluda | |
| 9,037,673 B2 | 5/2015 | Horr | |
| 9,141,792 B2 | 9/2015 | Saluda | |
| 9,143,944 B2 | 9/2015 | Gong | |
| 9,294,562 B2 | 3/2016 | Gong | |

(Continued)

FOREIGN PATENT DOCUMENTS

EP 3512164 A1 7/2019
GB 2535838 A 8/2016

(Continued)

OTHER PUBLICATIONS

Partial European Search Report for EP22196335.8 mailed Feb. 1, 2023, 12 pages.

(Continued)

*Primary Examiner* — Rasheed Gidado
(74) *Attorney, Agent, or Firm* — Fletcher Yoder, P.C.

(57) ABSTRACT

A system may include drives that are communicatively coupled to and/or control I/O devices via communication option cards. The drives and/or the communication option cards may include a logic engine to control internal I/O devices and external I/O devices via single pair Ethernet (SPE) conductors accessible via an Ethernet network.

20 Claims, 9 Drawing Sheets

(56) References Cited

U.S. PATENT DOCUMENTS

| | | |
|---|---|---|
| 9,696,704 B2 | 7/2017 | Xu et al. |
| 11,036,209 B2 | 6/2021 | Xu |
| 2005/0007964 A1 | 1/2005 | Falco |
| 2006/0047778 A1 | 3/2006 | Adams et al. |
| 2006/0224748 A1 | 10/2006 | Gupta |
| 2009/0065571 A1 | 3/2009 | Jain |
| 2009/0254639 A1 | 10/2009 | Manchester |
| 2010/0064024 A1 | 3/2010 | Horr |
| 2010/0153771 A1 | 6/2010 | Gordon et al. |
| 2011/0222412 A1* | 9/2011 | Kompella ............... H04L 45/00 370/241.1 |
| 2014/0137246 A1 | 5/2014 | Saluda |
| 2014/0325194 A1 | 10/2014 | Brindle |
| 2015/0076901 A1 | 3/2015 | Panguluri et al. |
| 2016/0050116 A1 | 2/2016 | Sheshadri |
| 2017/0078382 A1 | 3/2017 | Prakash et al. |
| 2019/0205373 A1* | 7/2019 | Walsh ................. G06F 40/205 |
| 2019/0250910 A1 | 8/2019 | Yu |
| 2019/0342296 A1 | 11/2019 | Anandam |
| 2019/0342328 A1 | 11/2019 | Rivner |
| 2022/0035762 A1* | 2/2022 | Zhang ................ G06F 13/4068 |

FOREIGN PATENT DOCUMENTS

| | | |
|---|---|---|
| KR | 20100034395 A | 4/2010 |
| WO | 2012080580 A1 | 6/2012 |
| WO | 2016066371 A1 | 5/2016 |
| WO | 2018018820 A1 | 2/2018 |

OTHER PUBLICATIONS

Extended European Search Report for EP Application No. 20191255.7 mailed Apr. 16, 2021, 15 pages.
Partial European Search Report for EP Application No. 20191255.7 mailed Jan. 28, 2021, 14 pages.
Allen Bradley; "Controllogix Peer-to-Peer 1/0;" May 2012; 2 pages.
Extended European Search Report for EP22196335.8 mailed May 19, 2023, 15 pages.

* cited by examiner

OPTION CARD FOR FACILITATING COMMUNICATION IN DRIVE APPLICATIONS

CROSS-REFERENCE TO RELATED APPLICATIONS

This application is related to co-pending U.S. patent application Ser. No. 17/484,900, entitled "MULTI-DRIVE USAGE BASED ON SINGLE PAIR ETHERNET," and co-pending U.S. patent application Ser. No. 17/484,948, entitled "EMPLOYING SINGLE PAIR ETHERNET FOR ZONED SAFETY IN DRIVE APPLICATIONS," each of which are incorporated herein by reference for all purposes.

BACKGROUND

This disclosure relates generally to input/output devices within an industrial automation system. More particularly, embodiments of the present disclosure are related to efficiently connecting the input/output devices to a communication network (e.g., Ethernet network).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial automation systems may include automation control and monitoring systems. The automation control and monitoring systems may monitor statuses and/or receive information from a wide range of devices, such as valves, electric motors, a wide range of sensors, other suitable monitoring devices, or the like. One or more components of the automation control and monitoring systems, such as programming terminals, automation controllers (e.g., programmable logic controller (PLC) or a programmable logic device (PLD)), input/output (I/O) modules, communication networks, human-machine interface (HMI) terminals, and the like, may use the statuses and/or received information to provide alerts to operators to change or adjust operation of one or more devices of the industrial automation system (e.g., such as adjusting operation of one or more actuators), to manage the industrial automation system, or the like.

The components (e.g., supervisory control system) described above may also send data and/or commands to one or more input/output (I/O) devices and/or drives within a control cabinet of the of the industrial automation system. The I/O devices and/or drives may be connected to an Ethernet network (e.g., Ethernet/IP), such that the I/O devices and/or drives may receive data (e.g., statuses and/or information from the wide range of devices) to perform operations. In some embodiments, a control system of a drive may receive the data to make control decisions. However, connecting each I/O device and/or drive directly to a communication network may result in increased cost within each product, require a bundle of cables to route and manage, and require a network switch for each product to connect into which may be cumbersome and not ideal to the customer's needs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes circuitry to control one or more operations of a drive configured to provide alternative current (AC) voltage to a load device. The system also includes a first communication option card and a second communication option card. The first communication option card communicatively couples to the circuitry and a first set of input/output (I/O) devices via a first set of conductors comprising single pair Ethernet (SPE) conductors. The second communication option card communicatively couples to the circuitry and a second set of I/O devices via a second set of conductors comprising additional single pair Ethernet (SPE) conductors. Further, the first communication option card and the second communication option card communicate to the first set of I/O devices and the second set of I/O devices, respectively, using different communication media and paths.

In a further embodiment, a method includes a processor receiving a data packet that includes one or more output commands associated with an input/output (I/O) device from one or more components of a communication network and determining a type of input/output (I/O) device associated with the one or more output commands. The processor may also identify a communication option card associated with the type of I/O device and transmit the one or more output commands to the communication option card associated with the I/O device via single pair Ethernet (SPE) conductors. Further, the processor may receive, via the communication option card, status data associated with the one or more output commands from the I/O device via the SPE conductors as well as transmit, via the communication option card, the status data to the one or more components of the communication network.

In an additional embodiment, a communication option card includes circuitry that communicatively couples to a set of input/output (I/O) devices. The circuitry may receive a data packet directed to at least one I/O device of the set of I/O devices, where the data packet is received via a first communication path. The circuitry may also generate an additional data packet configured to be transmitted according to a second communication path associated with the at least one I/O device of the set of I/O devices and transmit the additional data packet to the at least one I/O device of the set of I/O devices.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
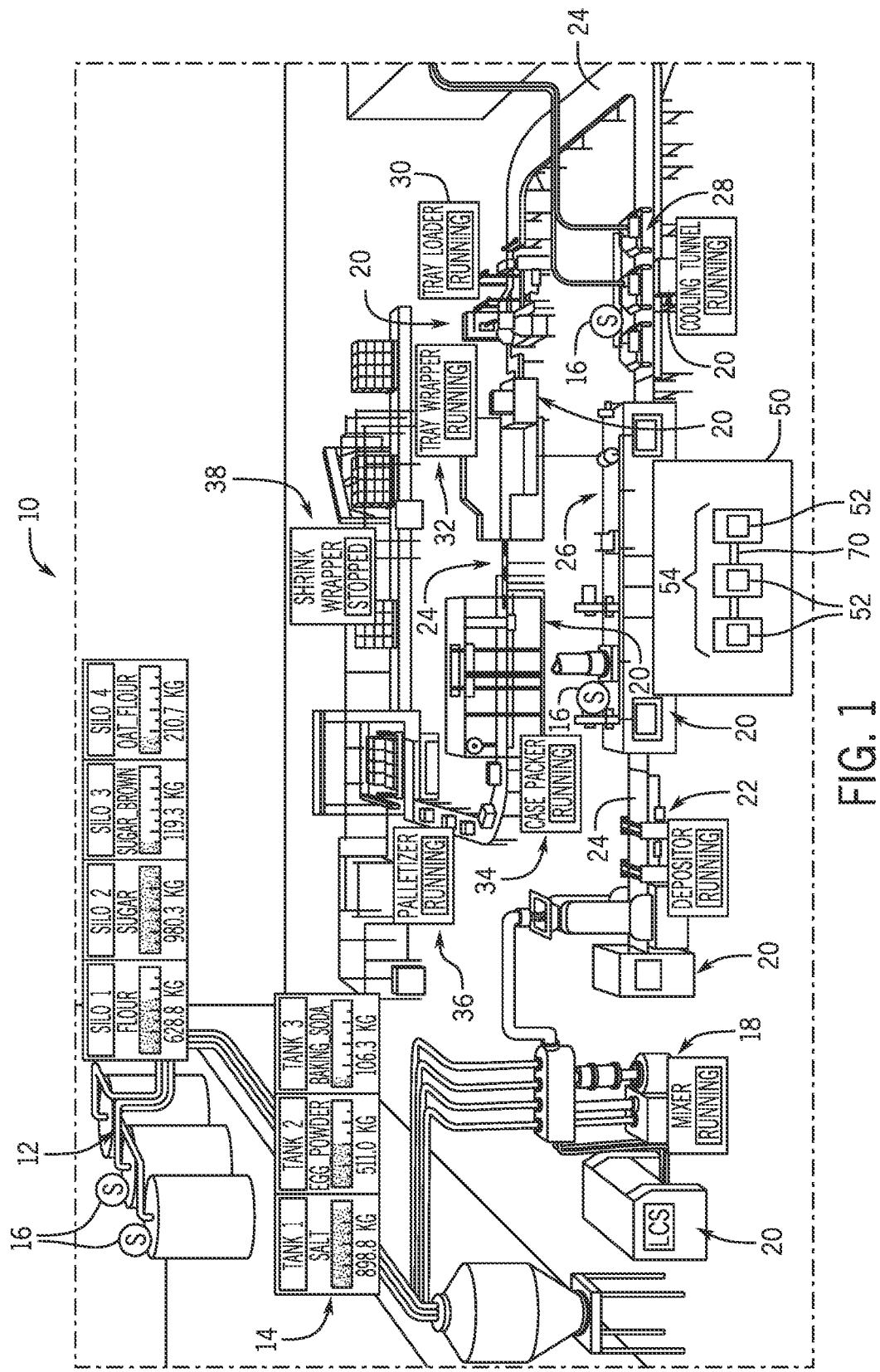
FIG. 1 illustrates an example industrial automation system employed by a food manufacturer, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification.

Industrial automation systems may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, a drive associated with a control system may control load and position of a rod pump to perform an oil extraction process. Although examples are provided with regard to specific contexts, one of ordinary skill in the art will recognize that these examples are not intended to be limiting and that the techniques described herein can be used with any suitable context.

To improve operation of industrial automation systems, components of the industrial automation system (e.g., supervisory control system) may monitor performance of one or more devices (e.g., machines, sensors) with respect to the industrial automation process as a whole. Statuses and/or information from the one or more components (e.g., supervisory control system) may be transmitted to respective control systems of drives associated with the one or more devices via an Ethernet network. Respective control system of the drives may use the statuses and/or information to make control decisions related to the one or more devices controlled or coupled to the drive. As mentioned above, each drive may be housed in a control cabinet associated with the industrial automation system, and each drive may include a control system to control operations of respective components (e.g., load devices, motor). In some embodiments, the control system of each drive and components such as the supervisory control system may have similar processing capabilities. To enable the control system to receive statuses and/or information from the one or more components, each drive may be connected to a communication network such as an Ethernet network. As used herein, the external Ethernet network may be any Ethernet based communication network including industrial networks such as ProfiNet, Modbus TCP, BACnet/IP, EtherCAT, or Ethernet/IP.

Drives (e.g., medium voltage drives and large, low voltage drives) may be connected to remote devices or locally embedded devices that are capable of interacting with the drives. Such devices may include push buttons, pilot lights, contactors, switches, starters, fans, and other input/output devices. Drives may include option cards that communicatively couple and/or control respective input/output devices. Each discrete input/output device may be coupled to and/or controlled by a respective option card. As used herein, an option card includes a slot, I/O point, communication channel, port, and the like associated with at least one I/O device within a drive. The I/O device may include any suitable module or component that provides connectivity between certain devices. By way of example, the I/O devices may include terminal blocks, remote devices, distributed devices, sensor networks, signal conditioning devices, and the like. Keeping this in mind, connecting (e.g., hardwiring) each different I/O device to a drive via a respective option card may be cumbersome, cost inefficient, and result in a bundle of cables, which may be difficult to maintain. It may be desirable to effectively connect multiple input/output devices to a drive while reducing number of wires, number of option cards within the drive, and overall cost of the control cabinet. Accordingly, the present disclosure provides techniques for connecting multiple I/O devices to a drive via a communication option card (e.g., gateway communication option card).

In some embodiments, a drive may include a gateway communication device. As used herein, a gateway communication device may be a communication device that is directly (e.g., no intervening components) connected to an Ethernet network. In some embodiments, the gateway communication device or the drive (via the communication option card) may perform a scanning operation. That is, the gateway communication device or the drive (via the communication option card) may cyclically communicate with an I/O device that it controls. The gateway communication device (via the communication option card) may, for instance, send control data to the I/O device, and the I/O device may return status data associated with the control data. The gateway communication device may perform this operation repetitively for multiple drives. This repetitive process may be referred to as scanning.

Employing at least one option card that couples to a drive via the subnet conductors accessible via the Ethernet network eliminates excessive wiring and option cards within a drive. In some embodiments, the drive may include a single option card that couples to and/or control each I/O device on the Ethernet network. In other embodiments, the drive may include an option card that couples to and/or controls each internal I/O device on the Ethernet network and another option card that couples to and/or controls each internal I/O device on the Ethernet network. As used herein, internal I/O devices include I/O devices (e.g., internal product applications) that are accessible by a manufacturer of the industrial automation system. That is, each internal I/O device may interface with applications from a same manufacturer. As used herein, external I/O devices include I/O devices (e.g., stand-alone customer applications) that are accessible by a customer of the industrial automation system. Each external I/O device may interface with applications from different manufacturers or customers. Further, the drive may also include a hard-wired or network safety option card that may couple to and control operation of safety devices (e.g., relays, contactors). By coupling communication option cards to I/O devices and using intelligent I/O devices, operations, status information, (e.g., number of contacts) and other additional insights may be gleaned from the I/O devices.

In some embodiments, the subnet conductors may include single pair Ethernet (SPE) conductors. As used herein, single pair Ethernet (SPE) conductors may include a single pair of twisted wire for transmitting and receiving data. Non-limiting examples of single pair Ethernet (SPE) conductors include single pair Ethernet (SPE) cables, single pair Ethernet (SPE) wires, single pair Ethernet (SPE) traces, and single pair Ethernet (SPE) bars. In some embodiments, a network ribbon cable (e.g., five-line cable, six-line cable, seven-line cable) may include the single pair Ethernet (SPE) conductors. The single pair Ethernet (SPE) conductors may be used to couple the drives to the Ethernet network and communicatively couple each drive to each other and to the Ethernet network via the gateway communication device. While eliminating superfluous wiring, the single pair Ethernet (SPE) conductors within the network ribbon cable may have a transmission update rate (e.g., transmission update rate between 10 and 20 milliseconds). Each drive (e.g., communication option card) may include an interface (e.g., vampire tap, device that clamps onto cable, 10BASE5 cabling) that supports connection to the single pair Ethernet (SPE) cable.

By way of introduction, FIG. 1 illustrates an example industrial automation system 10 employed by a food manufacturer in which the present embodiments may be implemented. It should be noted that although the example industrial automation system 10 of FIG. 1 is directed at a food manufacturer, the present embodiments described herein may be employed within any suitable industry, such as automotive, IT, mining, hydrocarbon production, manufacturing, and the like. The following brief description of the example industrial automation system 10 employed by the food manufacturer is provided herein to help facilitate a more comprehensive understanding of how the embodiments described herein may be applied to components and a manufacturing application system to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, firewall, network switches (e.g., Ethernet switches, modular-managed, fixed-managed, service-router, industrial, unmanaged, etc.) and the like. The industrial automation devices 20, the mixer 18, and other machines are examples of components in the industrial automation system 10.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system, and the like. In some embodiments, each industrial automation device 20 or a group of industrial automation devices 20 may be controlled using a local control system (e.g., associated with a drive). The local control system may receive data regarding the operation of the respective industrial automation device, other industrial automation devices, user inputs, and other suitable inputs to control the operations of the respective industrial automation device(s) 20.

The local control system may have access to configuration data associated with the connected industrial automation devices (e.g., load device, motor). That is, the local control system 42 may include memory or a storage component that stores information concerning the configuration of each industrial automation device 20 connected to it. In some embodiments, the information or configuration data may be populated or input by an operator at the time the respective industrial automation device 20 is installed. Additionally, the local control system may query the connected industrial automation device 20 to retrieve configuration data, such as model number, serial number, firmware revision, assembly profile, and the like. In some embodiments, the supervisory control system may collect configuration data from multiple local control systems and store the information in a suitable memory or storage component.

In certain embodiments, the industrial automation devices 20 may include a communication feature that enables the industrial automation devices 20 to communicate data between each other and other devices. The communication feature may include a network interface that may enable the industrial automation devices 20 to communicate via various protocols such as Ethernet/IP, ControlNet, DeviceNet, ProfiNet, ModBus TCP, or any other industrial communication network protocol. Alternatively, the communication feature may enable the industrial automation devices 20 (e.g., components) to communicate via various wired, such as Ethernet (e.g., single pair Ethernet (SPE)), and the like or wireless communication protocols, such as Wi-Fi, mobile telecommunications technology (e.g., 2G, 3G, 4G, LTE, 5G), Bluetooth®, near-field communications technology, and the like.

As mentioned above, the industrial automation devices 20 may be controlled using a local control system. The local control system may be disposed within a respective drive 54. One or more drives 54 may be disposed in a control cabinet 50 of the industrial automation system 10. Along with the one or more drives 54, the control cabinet 50 may house include one or more gateway communication device of the industrial automation system 10. In some embodiments, as illustrated in FIG. 1, the one or more gateway communication devices may be enclosed in a different housing than other drives. In other embodiments, at least one gateway communication device and at least one drive may be integrated together in a common housing.

The drive 54, which may include the gateway communication device, may receive data (e.g., status information) from components (e.g., supervisory control system) of the industrial automation system 10 via a communication network (e.g., Ethernet network) and facilitate routing of the data to another drive 54 and/or I/O device via single pair Ethernet (SPE) conductors 56. In some embodiments, the gateway communication device may be integrated with a drive and provide the drive with the ability to interface with the communication network. Based on receiving data from components (e.g., supervisory control system) of the industrial automation system 10 via the gateway communication device, a respective drive may make a control decision. In some embodiments, the components such as the supervisory control system may make the control decision, and the gateway communication device may transmit the data related to the control decision to a respective drive and/or I/O device. For example, the drive 54 may control torque, power, speed, direction, or any suitable operation of a respective industrial automation device 20 (e.g., load device, I/O device). That is, the drive 54 may include drive circuitry, such as switches (e.g., diodes, IGBTs, thyristors), that convert single-phase or multi-phase alternating current (AC) voltage into a controllable AC voltage that may be used to perform control operations for a load device, such as a motor. In addition, the gateway communication device may receive data from components (e.g., supervisory control system) via the communication network (e.g., Ethernet network) and transmit the data the I/O devices and/or other drives 54 via the single pair Ethernet (SPE) conductors 56, or vice versa.

In some embodiment, each drive 54 (including the gateway communication device) may include a communication component, a processor, a memory, a storage unit, input/output (I/O) ports, a display (e.g., HMI), and other computing components. The communication component may be a wireless or wired communication component that may facilitate communication between the equipment and other communication capable devices. The processor may include any suitable single-core or multi-core processor that performs certain operations such as parsing data packets, performing certain computing commands, and other operations commonly performed by processors. As mentioned above, the drives 54 (e.g., including the gateway communication device) may include at least one communication option card (e.g., gateway option card) 52 to communicatively couple and/or control I/O devices on the Ethernet network via a subnet ribbon cable 70 or single pair Ethernet (SPE) conductors.

Figure 2:
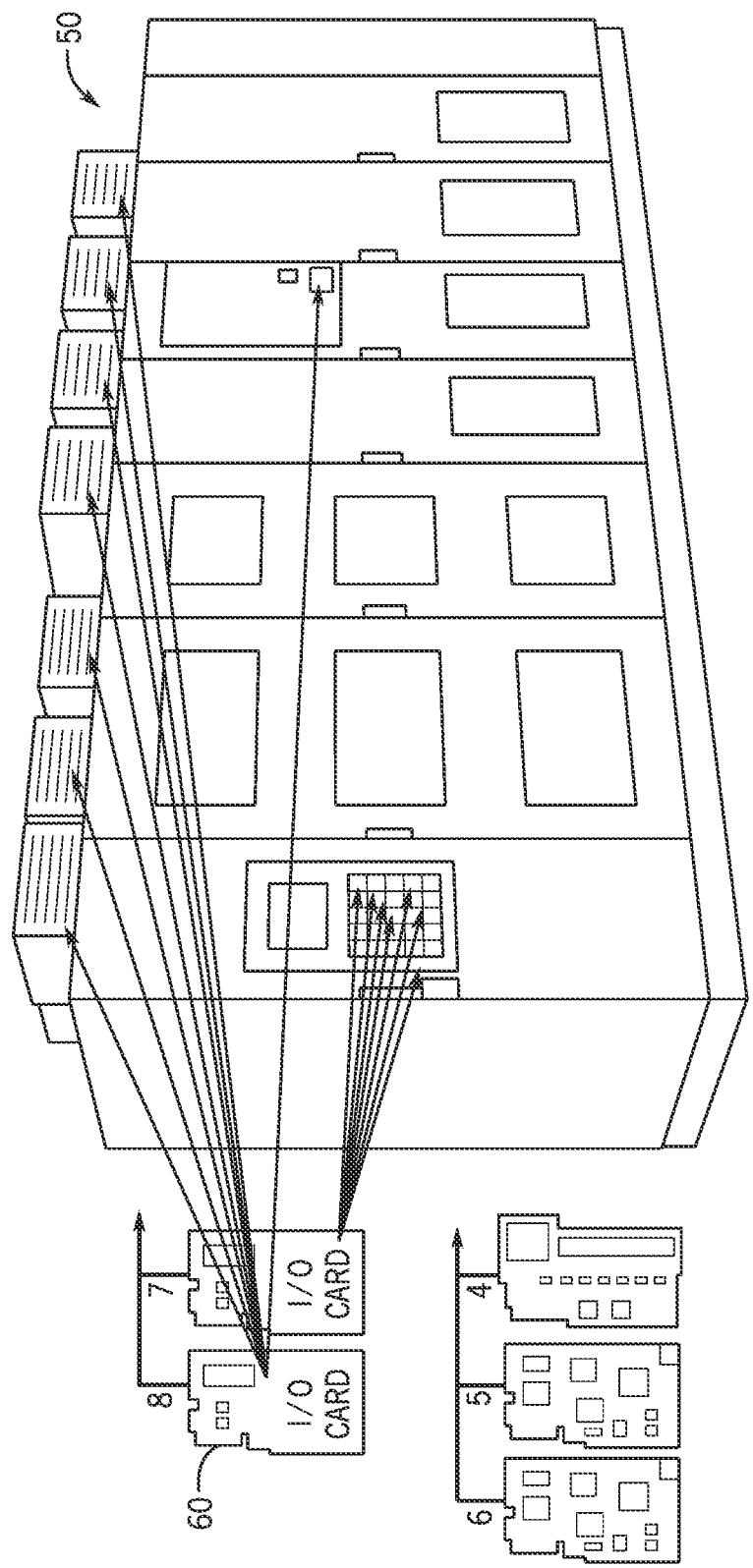
FIG. 2 illustrates drives of the industrial automation system of FIG. 1 including respective option cards to control discrete input/output (I/O) devices, in accordance with an embodiment of the present disclosure.

FIG. 2 illustrates drives including multiple option cards (e.g., slots, communication channels, I/O points within a drive) to facilitate communication with each I/O device. That is, each I/O device is hardwired to a respective option card 60 within the control cabinet 50. However, hardwiring each I/O device separately to a drive 54 via discrete I/O cards may result in excessive wiring and may not be cost effective. Instead, reducing the number of wires and number of option cards to couple I/O devices to drives 54 may be desirable.

Figure 3:
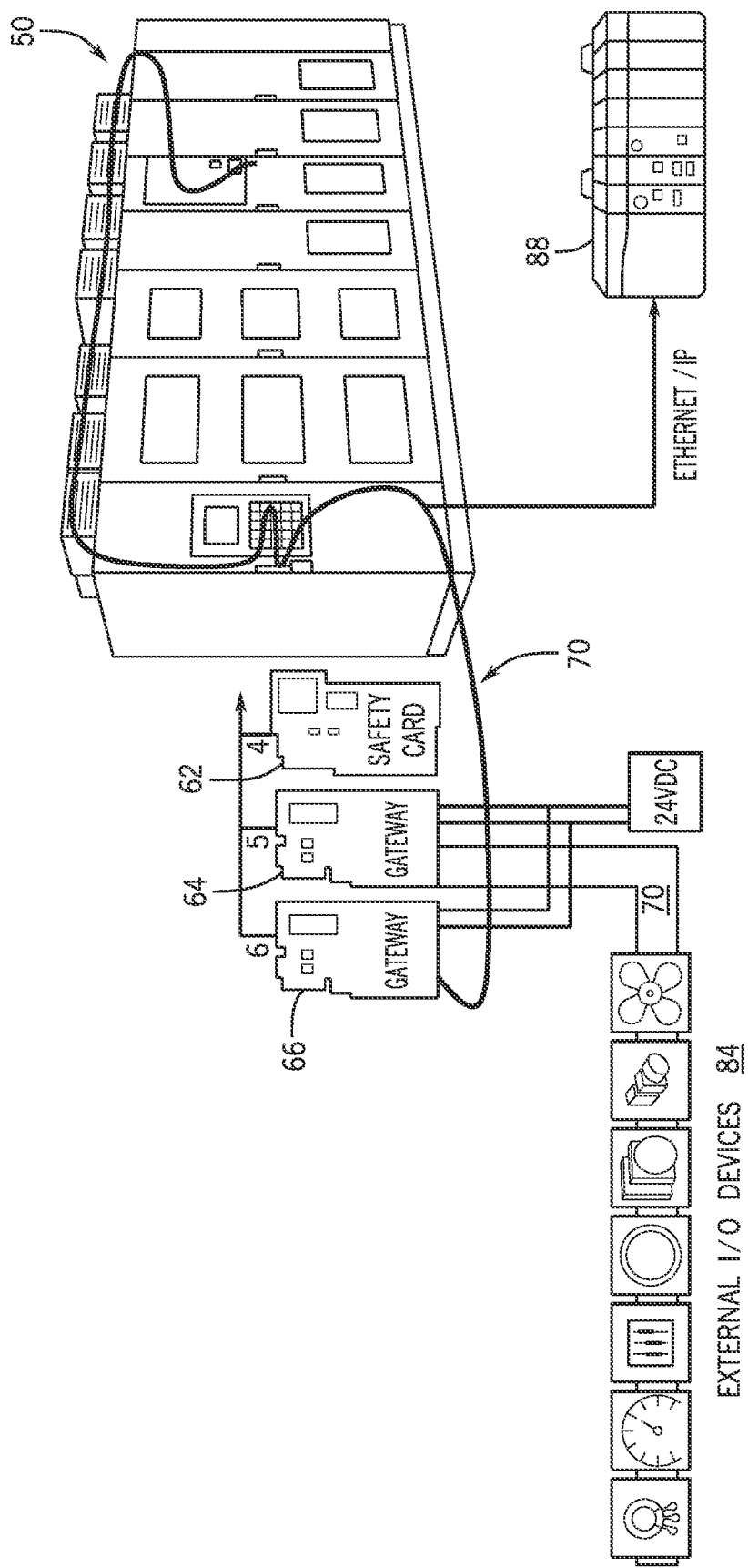
FIG. 3 illustrates drives of the industrial automation system of FIG. 1 including a communication option card to control intelligent I/O devices, in accordance with an embodiment of the present disclosure.

As such, FIG. 3 illustrates drives 54 of the industrial automation system 10 that may use communication option cards 52 to control intelligent I/O devices, in accordance with an embodiment of the present discourse. A drive 54 may include a communication option card 64 to communicatively couple to external I/O devices 84 via a subnet ribbon cable 70 accessible via the Ethernet network (e.g., Ethernet/IP). That is, the communication option card 64 may include circuitry or a control system that facilitates communication between some control system (e.g., controller) and a set of devices via the subnet ribbon cable 70. The communication option card 64 may translate or prepare communication packets for distribution via the subnet ribbon cable 70. In this way, the communication option card 64 may enable different types of devices or control systems to access components that may be operating using a different communication path. By way of example, the communication option card 64 may facilitate communication between a controller 88 and external I/O devices 84 via the subnet ribbon cable 70, as shown in FIG. 3.

The subnet ribbon cable 70 may include single pair Ethernet (SPE) conductors 56. As mentioned above, external I/O devices may include I/O devices (e.g., stand-alone customer applications) that are accessible by a manufacturer of the industrial automation system 10. The drive 54 may also include another communication option card 66 to communicatively couple to internal I/O devices via a subnet ribbon cable 70 accessible via the Ethernet network (e.g., Ethernet/IP). The communication option card 66 may perform translation operations to enable the controller 88 to communicate with the internal I/O devices, which may communicate using a different communication path as compared to the external I/O devices 84. As used herein, internal I/O device include I/O devices (e.g., internal product applications) that are accessible by a customer of the industrial automation system 10. In additional and/or alternative embodiments, the drive 54 may include a single communication option card that communicatively couples to each I/O device (e.g., including external I/O devices 84 and internal I/O devices). It can be appreciated that the drives 54 may include any suitable number of communication option cards to communicatively couple and/or control I/O devices. Further, the drive 54 may include a hard-wired or network safety option card. As used herein, the safety option card may be coupled to safety components of the industrial automation system 10. Further, information such as level of protection and number of protective features related to components of the industrial automation system 10 may be acquired via the safety option card.

In some embodiments, drive circuitry of the drives 54 or the communication option cards may control I/O devices. In other embodiments, a controller 88 (e.g., supervisory control system) may control the I/O devices. As such, each drive 54 may include an interface or a port that is communicatively coupled to the controller 88 via the Ethernet network (e.g., Ethernet/IP).

In some embodiments, the drive 54 may be coupled to a power supply. For example, the drive 54 may have an interface that may connect to the power supply and the subnet ribbon cable 70 or single pair Ethernet (SPE) conductors 56. The interface may include a connector to connect to subnet ribbon cable 70 or the single pair Ethernet (SPE) conductors 56. In some embodiments, a connector may include two pins to connect to the single pair Ethernet (SPE) conductors 56. In other embodiments, the connector 302 may include more than two pins to support the subnet ribbon cable 70 (e.g., five-line subnet ribbon cable, six-line subnet ribbon cable, seven-line subnet ribbon cable). Further, the interface may include a connector to connect to the power supply in addition to the single pair Ethernet (SPE) conductors 56.

Figure 4:
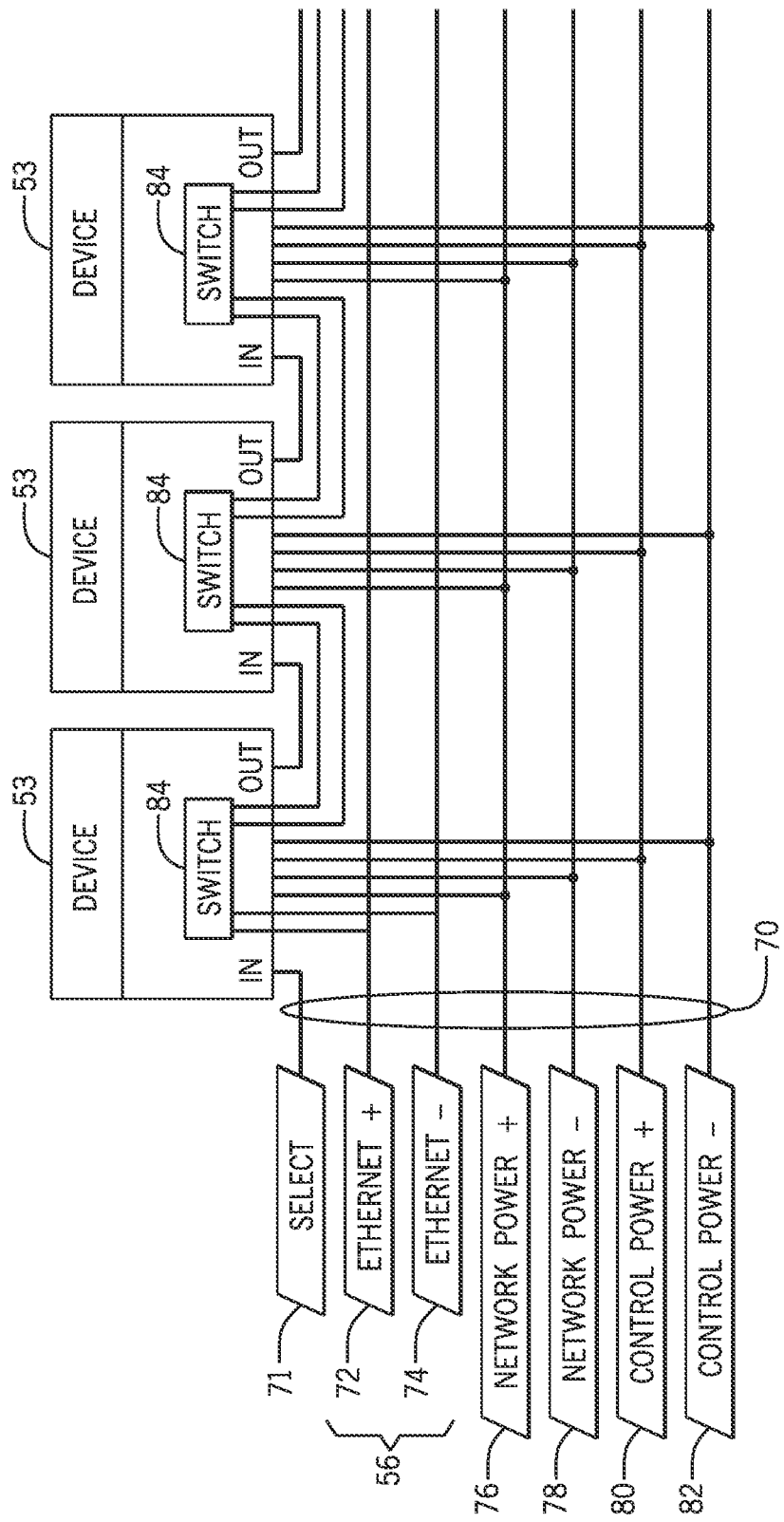
FIG. 4 illustrates an example subnet ribbon cable used to connect drives and/or I/O devices of the industrial automation system of FIG. 1, in accordance with an embodiment of the present disclosure.

To reduce cost and to gain connected enterprise functionality, the number of I/O devices and/or drives 54 that can be connected to the Ethernet network, and provide better connectivity properties between drives 54, the single pair Ethernet (SPE) conductors 56 or the subnet ribbon cable 70 (e.g., ribbon cable having the single pair Ethernet (SPE) conductors 56) may be used to connect each drive 54 to the Ethernet network. Accordingly, FIG. 4 illustrates one example infrastructure, such as the subnet ribbon cable 70, that may be used to perform the embodiments discussed herein. As used herein, the subnet ribbon cable 70 may include a series of single conductor wires placed parallel to each other and molded together. The subnet ribbon cable 70 may receive and transmit data between devices 53. A subnet (e.g., Ethernet/IP) is a portion of the communication network logically designated for transmitting messages between devices 53. In some embodiments, the devices 53 may include a drive, an internal I/O device, or an external I/O device.

In some embodiments, as discussed above, a particular communication option card may be used to connect to a set of devices that communicate using one communication path and another communication option card may communicate with another set of devices that communicate using a different communication path. As such, devices that operate using different communication paths may be integrated into one system by employing different communication option cards, which may translate received commands and requests into an appropriate communication packet for distribution to a specified device. By employing the communication ribbon cable 70, the connected devices are not individually wired back to the communication option card and thus the number of wires distributed to these devices are limited.

Each device 53 may be communicatively coupled to other components of the industrial automation system 10 via a communication network (e.g., Ethernet network) and/or sub networks (e.g., sub-nets) of the communication network. Keeping this in mind, in some embodiments, the subnet ribbon cable 70 may include a select signal 71, network power positive signal 76 and negative signal 78, an Ethernet positive signal 72 and negative signal 74 (e.g., the single pair Ethernet (SPE) conductors 56), and a control power positive signal 80 and negative signal 82. The select signal 71 may serve to select or access additional devices 53 connected to a gateway communication device. For example, the gateway communication device (e.g., via the gateway option card) may send a select signal 71 to one of the device 53 to identify the device 53, provide an IP address for the device 53, or the like. That is, when the select signal 51 is provided to a particular device 53, the particular device 53 may be assigned an internet protocol (IP) address that serves as identification for the particular device 53. The gateway communication device may identify each device 53 and respective data properties for scanning purposes.

Referring again to the subnet ribbon cable 70, the network power positive signal 76 and negative signal 78 may deliver power to network components of each of the devices 53 and components from a power supply or tapped connection off of another electrical coupling. The Ethernet positive signal 72 and negative signal 74 (e.g., the single pair Ethernet (SPE) conductors 56) may provide network communication functionality using a single pair Ethernet (SPE) protocol. In some embodiments, the Ethernet positive signal 72 and negative signal 74 may be a part of a bus system. The control power positive signal 80 and negative signal 82 may power an actuator (e.g., a contactor coil) or other control mechanism for at least one of the devices 53. An actuator may execute a control operation for the device 53. For example, a control operation of the device 53 may include closing a contactor to connect a motor to a power source, the device 53, or the like.

It can be appreciated that any suitable number of pins and lines may be used to form the subnet ribbon cable 70 (e.g., five-line ribbon cable, seven-line ribbon cable). As illustrated in FIG. 4, the subnet ribbon cable 70 may be a six-line cable that uses eight-pin connector circuitry to couple the devices 53 to the communication network (e.g., Ethernet network) and each other.

In some embodiments, one or more of the devices 53 may be connected to the subnet ribbon cable 70 (e.g., having the single pair Ethernet (SPE) conductors 56) via respective vampire taps. Further, Ethernet signals may transmit through respective switches 84 of the devices 53 that may control a timing used to transmit messages between the devices 53 or between the devices 53 and components of the industrial automation system 10 via Ethernet communicative couplings.

Figure 5:
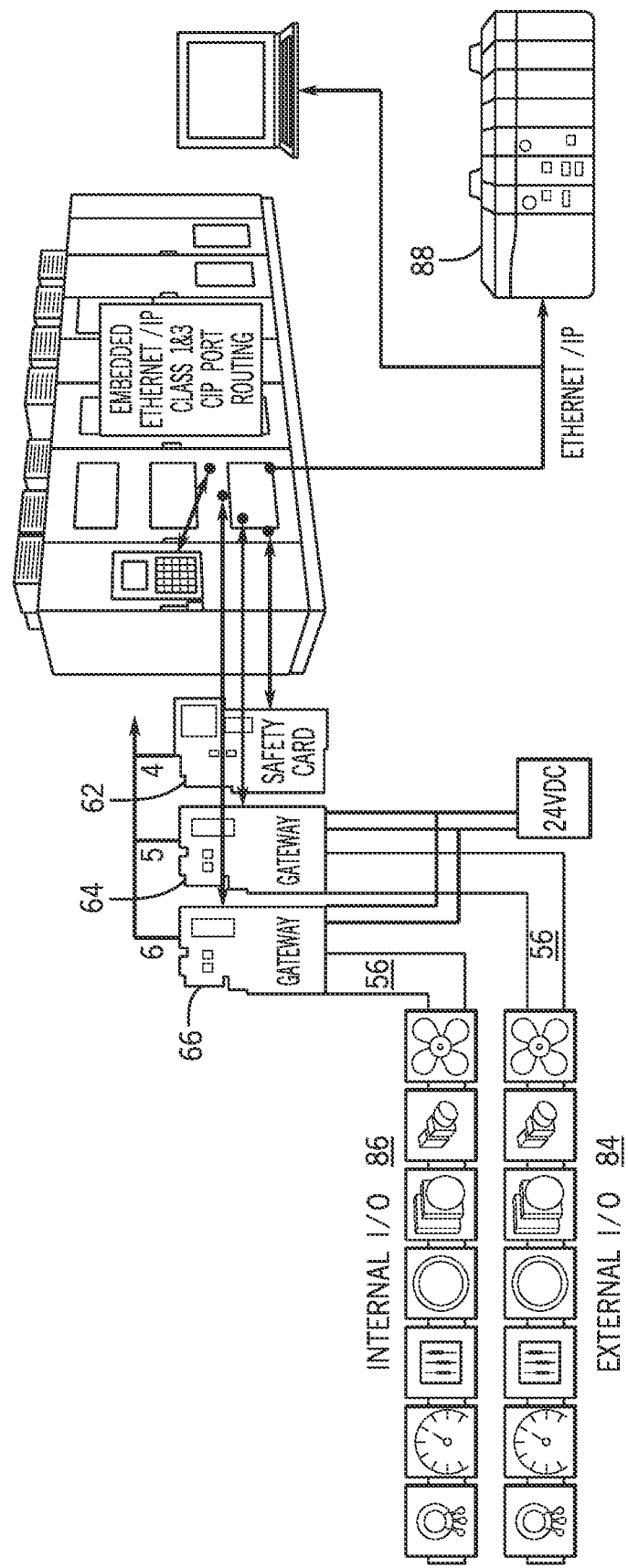
FIG. 5 illustrates a controller of the industrial automation system of FIG. 1 that potentially controls and/or configures (e.g., monitors) internal and external I/O devices, in accordance with an embodiment of the present disclosure.

With the preceding in mind, FIG. 5 illustrates the controller 88 of the industrial automation 10 that controls internal I/O devices 86 and external I/O devices 84, in accordance with an embodiment of the present disclosure. The controller 88 may control and monitor internal I/O devices 86 and external I/O devices 84. In some embodiments, based on receiving user input or commands from an operator of the industrial automation system 10, the controller 88 may send commands to control internal I/O devices 86 and external I/O devices 84 (e.g., control torque, power, speed, direction, or any suitable operation of a I/O device). Referring to FIG. 5, an example drive 54 may include an interface with a connector that communicatively couples to the controller 88 via the Ethernet network (e.g., Ethernet/IP). The interface may also include a connector that communicatively couples to the communication option card 66 associated with the internal I/O devices 86 and a connector that communicatively couples to the communication option card 66 associated with the external I/O devices 84. In some embodiments, the internal I/O devices 86 may be coupled to the drive 54 (e.g., communication option card 66) via similar subnet ribbon cable 70 (e.g., single pair Ethernet conductors) as the external I/O devices coupled to the drive 54 (e.g., communication option card 64). In other embodiments, the internal I/O devices 86 may be coupled to the drive 54 (e.g., communication option card 66) via different subnet ribbon cable 70 (e.g., single pair Ethernet conductors) as the external I/O devices coupled to the drive 54 (e.g., communication option card 64). Further, the interface may include a connector that communicatively couples to a safety option card 62 and a connector that communicatively couples to a control panel of the control cabinet 50. The communication option cards 64 and 66 and the safety option card 62 would be compatible with Class 1 (I/O) common industrial protocol (CIP) routing and Class 3 (messaging) common industrial protocol (CIP) routing associated with EtherNet/IP protocol and for 62 CIP network safety. As used herein, Class 1 routing or messaging is a cyclic I/O update messaging connection based on an update time from a client to a device. Further, Class 3 routing messaging is used to programmatically define when information may be obtained from a device.

Figure 6:
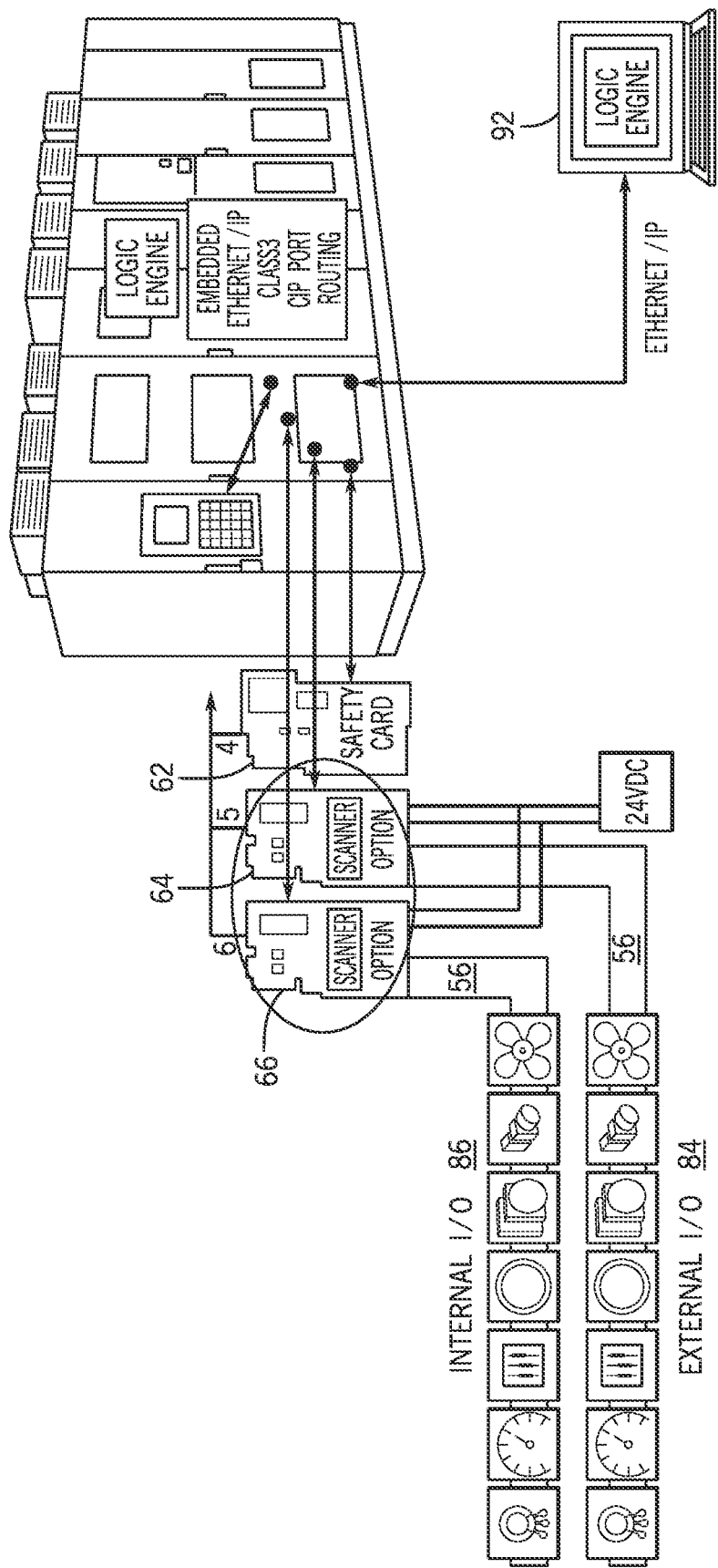
FIG. 6 illustrates drives of the of the industrial automation system of FIG. 1 including an embedded logic engine to control internal and external I/O devices along with the external configuration/monitoring of those devices, in accordance with an embodiment of the present disclosure.

In some embodiments, the I/O devices may be controlled by software embedded in a computing device, the drive, or some other suitable circuit. For instance, FIG. 6 illustrates drives that may employ an embedded logic engine 92 (e.g., hosted by a computing device) to control internal I/O devices 86 and external I/O devices 84, in accordance with an embodiment of the present disclosure. That is, the drive 54 may receive commands from a logic engine 92 or drive circuitry that may control the I/O devices. As used herein, the logic engine 92 may control outputs and status information of a respective I/O device. In some embodiments, the communication option cards 64 and 66 may operate as a gateway communication device with scanning capabilities. That is, communication option cards 64 and 66 may cyclically communicate with a connected I/O device. The communication option cards 64 and 66 may, for instance, send control data to the I/O device, and the I/O device may return status data associated with the device. The communication option cards 64 and 66 may perform this operation repetitively for multiple drives. This repetitive process may be referred to as scanning. In some embodiments, the communication option cards 64 and/or 66 may include a memory component that is periodically updated to include scanned information for each of the external I/O devices 84 and/or internal I/O devices 86, respectively.

Figure 7:
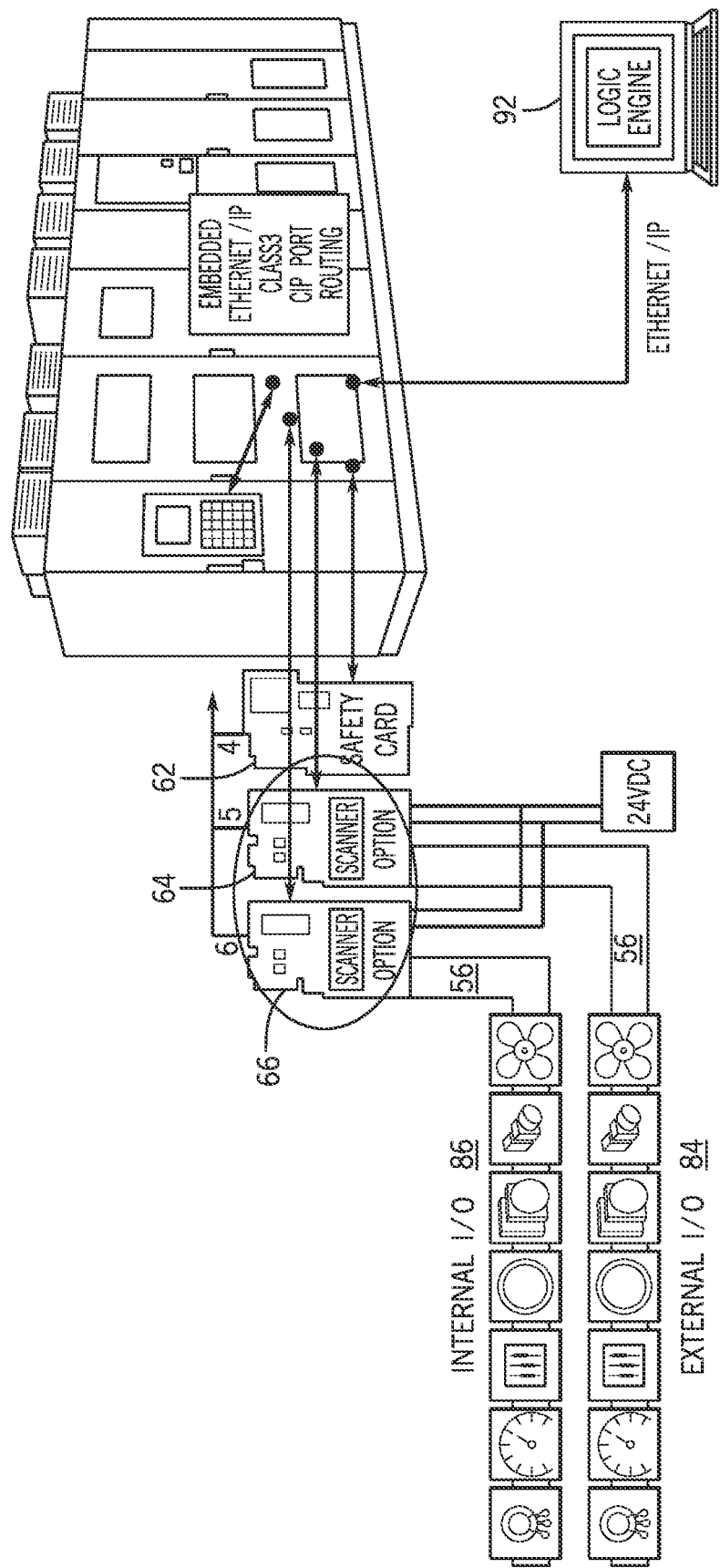
FIG. 7 illustrates the communication option card of FIG. 3 that includes an embedded logic engine to control internal and external I/O devices along with the external configuration/monitoring of those devices, in accordance with an embodiment of the present disclosure.

In some embodiments, the communication option cards 64 and 66 may include the logic engine 92 to control the I/O devices. Accordingly, FIG. 7 illustrates communication cards 64 and 66 including a logic engine 92 to control internal and external I/O devices, in accordance with an embodiment of the present disclosure. For example, the communication option card 64 may include the logic engine 92 to control the external I/O devices 84. As such, a customer may be able to access the drive and the logic engine 92 (e.g., send user input, commands) to alter control operations of the external I/O devices 84 (e.g., change speed of a fan) via the communication option card 64. In some embodiments (not illustrated), the communication option card 66 may also include the logic engine 92 to control the internal I/O devices 86. In other embodiments, rather than the logic engine 92, the communication option card 66 may include a manufacturing application to control the external I/O devices 84.

Figure 8:
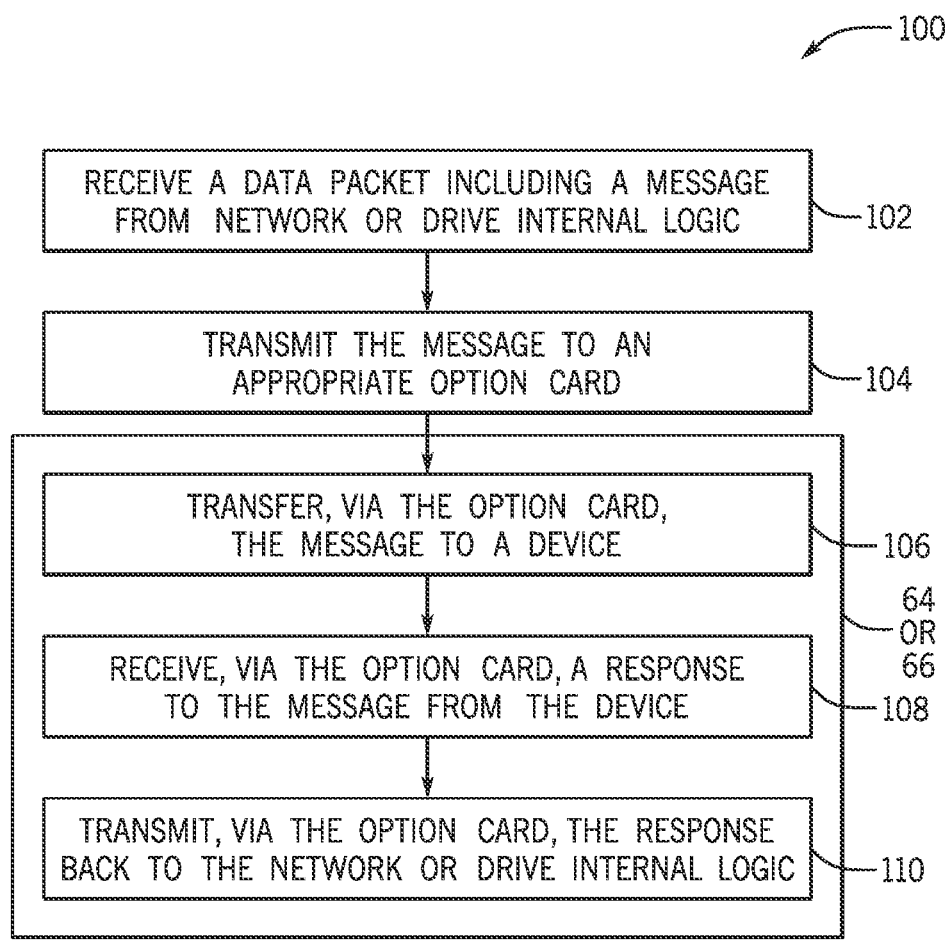
FIG. 8 is a flow chart of a process for facilitating communication (e.g., message) between an external network connected to a drive, embedded logic in the drive, or embedded logic in a communication option card and between devices of the industrial automation system of FIG. 1 via communication option cards, in accordance with an embodiment of the present disclosure.

With the preceding in mind, FIG. 8 is a flow chart of a process 100 for facilitating message communication (e.g., messages) between drives and devices via communication option cards, in accordance with an embodiment of the present disclosure. Although the following description of the process 100 will be discussed as being performed by the drive or the gateway communication device and the communication option card (e.g., communication option cards 64 and 66), it should be noted that any suitable computing component capable of accessing and interfacing with the communication option cards 64 or 66 may perform the relevant portion of the process 100. In addition, although the process 100 is described in a particular order, it should be noted that the process 100 may be performed in any suitable order.

At block 102, a control system of a drive may receive a data packet from components on an external network (e.g., supervisory control system) or from internal logic within the drive. The data packet may include a message data indicating or requesting status information, performance attributes, status requests, data requests, data write operations, and other operations associated with industrial automation devices, other drives, or any other suitable component communicatively coupled to the drive. For example, the control system of the drive may receive message data related to a requested speed, torque, power, and the like of a I/O device (e.g., fan) from the supervisory control system via the Ethernet network. The message data may define a type of data, a size of data, a data source, and other properties associated with the payload data that is part of the message data or the requested that the message data is seeking. The drive may include one or more communication components (e.g., ports, modems, network switches) that couple to the Ethernet network to receive the message data from the supervisory control system or the internal logic.

At block 104, the control system of the drive may parse the message data to determine a suitable communication option card that has access to one or more destination devices associated with the message data. That is, by way of example, the control system may consult a lookup table or memory component to determine the available communication option cards connected to the control system. Based on the destination device specified by message data and the available communication option cards, the control system may identify the suitable communication option card that has access to the destination device. The control system may then transmit the message data to the identified communication option card (e.g., communication option cards 64 and 66).

At block 106, the control system of the drive, via the communication option card 64 or 66 identified from the block 104, may transmit the message data to the destination device (e.g., another drive, I/O device) on an Ethernet network (e.g., Ethernet/IP). As such, the message data may include an internet protocol (IP) address that serves as identification of the destination device associated with the message. That is, the control system of the drive may identify the destination device, such as an I/O device, based on a portion (e.g., the payload portion or addressing portion) of the message data. The control system may then transmit the message data to the destination I/O device via the communication option card identified at block 104.

After receiving the message data from the communication option card, the destination device (e.g., I/O device) may generate a response. Non-limiting example of the response include write requests or data requests from the device. Accordingly, at block 108, the control system of the drive, via the communication option card, may receive the response to the message data from the destination device. In some embodiments, the control system of the drive may generate an additional data pack including the response, such that the additional data packet is in a format that may be interpreted by components on the external network.

At block 110, the control system of the drive, via the communication option card, may transmit the response and/or the additional data packet to the components that are on the external network or internal logic.

Figure 9:
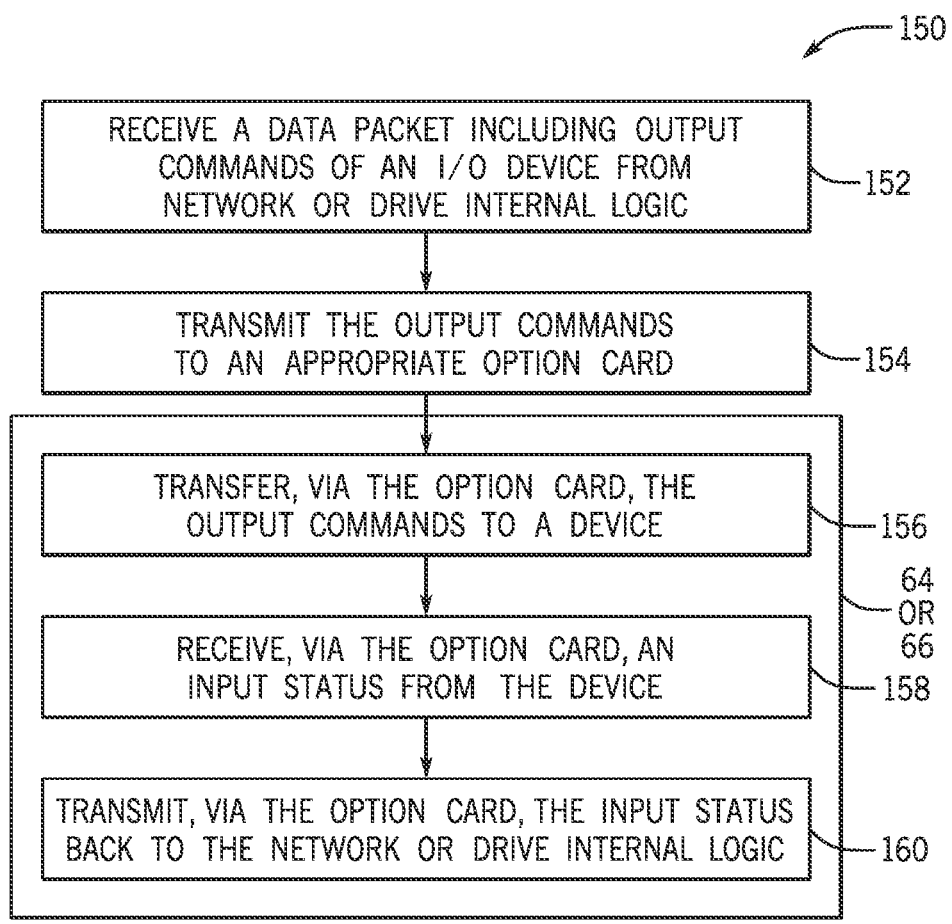
FIG. 9 is a flow chart of a process for facilitating communication (e.g., output commands, input status of I/O devices) between an external network connected to a drive, embedded logic in the drive, or embedded logic in a communication option card and the I/O devices of the industrial automation system of FIG. 1 via communication option cards, in accordance with an embodiment of the present disclosure.

Similar to FIG. 8, FIG. 9 is a flow chart of a process 150 for facilitating I/O data communication (e.g., output commands, input status from I/O devices) between drives and I/O devices (e.g., internal I/O devices 86 and external I/O devices 84) via communication option cards, in accordance with an embodiment of the present disclosure. Although the following description of the process 150 will be discussed as being performed by the drive or the gateway communication device and the communication option card (e.g., communication option cards 64 and 66), it should be noted that any suitable computing component capable of interacting with the communication option card may perform the process 150. In addition, although the process 150 is described in a particular order, it should be noted that the process 150 may be performed in any suitable order.

At block 152, the control system of a drive may receive a data packet with an I/O data component from components on an external network (e.g., supervisory control system) or from internal logic within the drive. The I/O data component may include input/output commands and/or requests received from internal I/O devices 86 and/or external I/O devices 84. The I/O data component may be of a certain format that corresponds to a type of I/O device intended to be a destination device or target device for the I/O data component. For example, the drive 54 may receive I/O data components related to an output command to change speed, torque, power, and the like of a I/O device (e.g., fan) from the supervisory control system via an Ethernet network. The drive may include one or more communication components (e.g., ports, modems, network switches) that couple to the Ethernet network to receive the output commands from the supervisory control system or the internal logic.

At block 154, the control system of the drive may determine a suitable communication option card that has access to the target device of the I/O data component. The control system may then transmit the I/O data component to the suitable communication option card (e.g., communication option cards 64 and 66) similar to the process described in block 104 of FIG. 8. For example, based on the target I/O device being an external I/O device 84, the drive may identify the communication option card 64, which is accessible to and capable of communicating with the external I/O device 84. Conversely, if the IO data component specified the target I/O device as an internal I/O device 86, the control system may identify the communication option card 66, which is accessible to and capable of communicating with the internal I/O device 86. In some embodiments, the communication option card for the I/O device may be associated with a particular manufacturer, communication path, or the like. As such, each I/O device associated with a particular manufacturer may have the output commands and data packets routed to a particular communication option card to facilitate communication to the respective I/O device.

At block 156, the control system of the drive, via the communication option card identified from the block 154, may transmit the IO data component (e.g., output commands, requested speed) to the I/O device (e.g., fan) associated with the output commands on the Ethernet network.

At block 158, the control system of the drive, via the communication option card (e.g., option card 64 or 66), may receive status data associated with the IO data component from the target I/O device (e.g., external I/O device 84 or internal I/O device 86). Similar to block 108 of FIG. 8, the control system of the drive may generate an additional data pack including the status data, such that the additional data packet is in a format that may be interpreted by components on the external network.

At block 160, the control system of the drive, via the communication option card, may transmit the input status to components on the external network (e.g., supervisory control system) or the internal logic of the drive.

It can be appreciated that internal I/O devices 86 and external I/O devices may be controlled based on different communication option cards to allow one industrial automation system 10 to operate in a cohesive manner while employing a variety of types of I/O devices. By employing intelligent I/O devices and communication option cards within drives, the intelligent I/O devices may be effectively controlled and additional information such as operations, status information, (e.g., number of contacts) and may be gleaned from the intelligent I/O devices.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for

[perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. A system, comprising:
   circuitry configured to control one or more operations of a drive configured to provide alternative current (AC) voltage to a load device;
   a first communication option card configured to communicatively couple to the circuitry and a first plurality of input/output (I/O) devices via a first set of conductors comprising single pair Ethernet (SPE) conductors, wherein a first I/O device of the first plurality of I/O devices is directly coupled to the first communication option card via the first set of conductors, and wherein each I/O device of a remaining portion of the first plurality of I/O devices is configured to couple to at least one I/O device of the first plurality of I/O devices, and wherein the first communication option card and each I/O device of the first plurality of I/O devices is configured to communicate via a first communication path; and
   a second communication option card configured to communicatively couple to the circuitry and a second plurality of I/O devices via a second set of conductors comprising additional single pair Ethernet (SPE) conductors, wherein a second I/O device of the second plurality of I/O devices is directly coupled to the second communication option card via the second set of conductors, and wherein each I/O device of a remaining portion of the second plurality of I/O devices is configured to couple to at least one I/O device of the second plurality of I/O devices, and wherein the second communication option card and each I/O device of the second plurality of I/O devices is configured to communicate via a second communication path different from the first communication path.

2. The system of claim 1, wherein the first plurality of I/O devices is configured to interface with one or more applications from a same manufacturer.

3. The system of claim 2, and wherein the first plurality of I/O devices comprises a push button, a pilot light, a switch, a starter, a contactor, or any combination thereof.

4. The system of claim 3, wherein the second plurality of I/O devices is configured to interface with one or more additional applications associated with a different manufacturer.

5. The system of claim 4, wherein the second plurality of I/O devices comprises an additional push button, an additional pilot light, an additional switch, an additional starter, an additional contactor, or any combination thereof.

6. The system of claim 1, wherein the first communication option card comprises a memory component that is periodically updated to include scanned information for each of the first plurality of I/O devices.

7. The system of claim 1, comprising a control system configured to:
   receive a data packet comprising message data from one or more components on a communication network;
   determine that the first communication option card is associated with the message data; and
   transmit the message data to the first communication option card.

8. The system of claim 7, wherein the first communication option card is configured to transmit the message data to an I/O device of the first plurality of I/O devices.

9. The system of claim 8, wherein the first communication option card is configured to receive a response associated with the message data from the I/O device of the first plurality of I/O devices.

10. The system of claim 9, wherein the first communication option card is configured to:
    generate an additional data packet based on the response and a communication path associated with the one or more components on the communication network; and
    transmit the additional data packet to the one or more components on the communication network.

11. The system of claim 1, wherein the first communication option card comprises a logic engine configured to control the one or more operations of the first plurality of I/O devices.

12. A method, comprising:
    receiving, via at least one processor, a data packet comprising one or more output commands associated with a first input/output (I/O) device of a plurality of I/O devices from one or more components of a communication network;
    determining, via the at least one processor, a type of input/output (I/O) device associated with the one or more output commands;
    identifying, via the at least one processor, a communication option card associated with the type of I/O device, wherein the communication option card is configured to communicatively couple to the at least one processor and the plurality of I/O devices via a set of conductors comprising single pair Ethernet (SPE) conductors;
    transmitting, via the at least one processor, the one or more output commands to the communication option card associated with the first I/O device via single pair Ethernet (SPE) conductors, wherein a second I/O device of the plurality of I/O devices is directly coupled to the communication option card via the first set of conductors, and wherein each I/O device of a remaining portion of the plurality of I/O devices is configured to couple to at least one I/O device of the plurality of I/O devices, and wherein the one or more output commands are routed to the first I/O device of the plurality of I/O devices a communication path comprising the SPE conductors and the second I/O device;
    receiving, via the communication option card, status data associated with the one or more output commands from the first I/O device via the SPE conductors and the second I/O device; and
    transmitting, via the communication option card, the status data to the one or more components of the communication network.

13. The method of claim 12, comprising transmitting, via the at least one processor, the one or more output commands to the communication option card in response to identifying the communication option card associated with the type of I/O device.

14. The method of claim 12, comprising:
    generating, via the at least one processor, an additional data packet comprising the status data based on the communication path associated with the communication option card; and
    transmitting, the additional data packet, to the one or more components of the communication network.

15. The method of claim 12, wherein the status data corresponds to one or more operations of the first I/O device.

16. A communication option card, comprising:

circuitry configured to:

communicatively couple to a first I/O device of a plurality of I/O devices via a direct connection and drive circuitry configured to operate one or more drives, wherein each I/O device of a remaining portion of the plurality of I/O devices is configured to couple to at least one I/O device of the plurality of I/O devices;

receive a data packet directed to a second I/O device of the plurality of I/O devices, wherein the data packet is received via a first communication path inaccessible to the plurality of I/O devices;

generate an additional data packet configured to be transmitted according to a second communication path associated with the second I/O device of the plurality of I/O devices; and transmit the additional data packet to the second I/O device of the plurality of I/O devices via the second communication path and the first I/O device.

17. The communication option card of claim 16, wherein the circuitry is configured to control one or more operations of the at least one I/O device of the plurality of I/O devices.

18. The communication option card of claim 16, wherein the communication option card is configured to communicatively couple to the second I/O device of the plurality of I/O devices via single pair Ethernet (SPE) conductors.

19. The communication option card of claim 16, wherein the communication option card comprises a memory component that is periodically updated to include scanned information for each of the plurality of I/O devices.

20. The communication option card of claim 16, wherein the plurality of I/O devices comprises a push button, a pilot light, a switch, a starter, a contactor, or any combination thereof.

* * * * *